Patented May 27, 1947

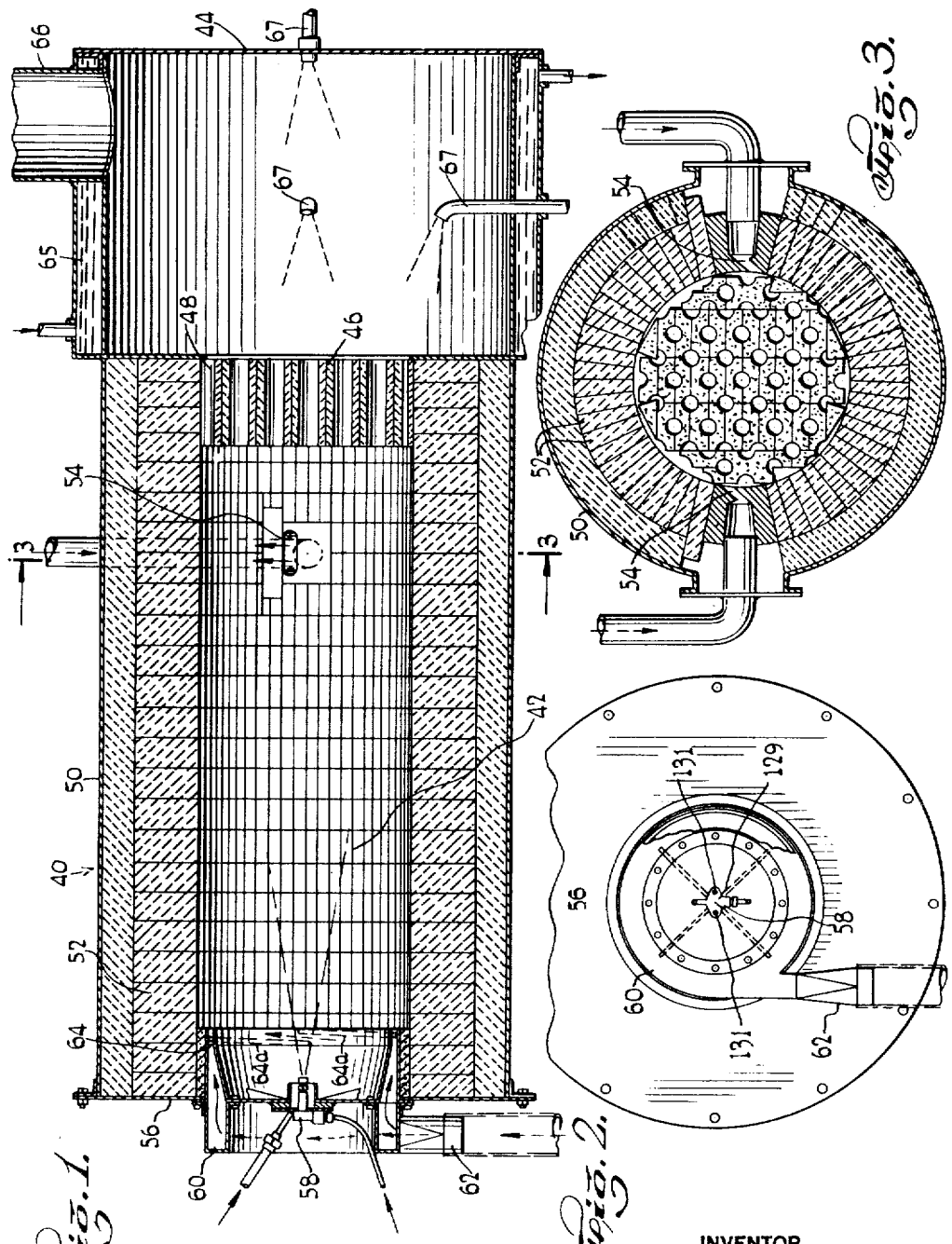

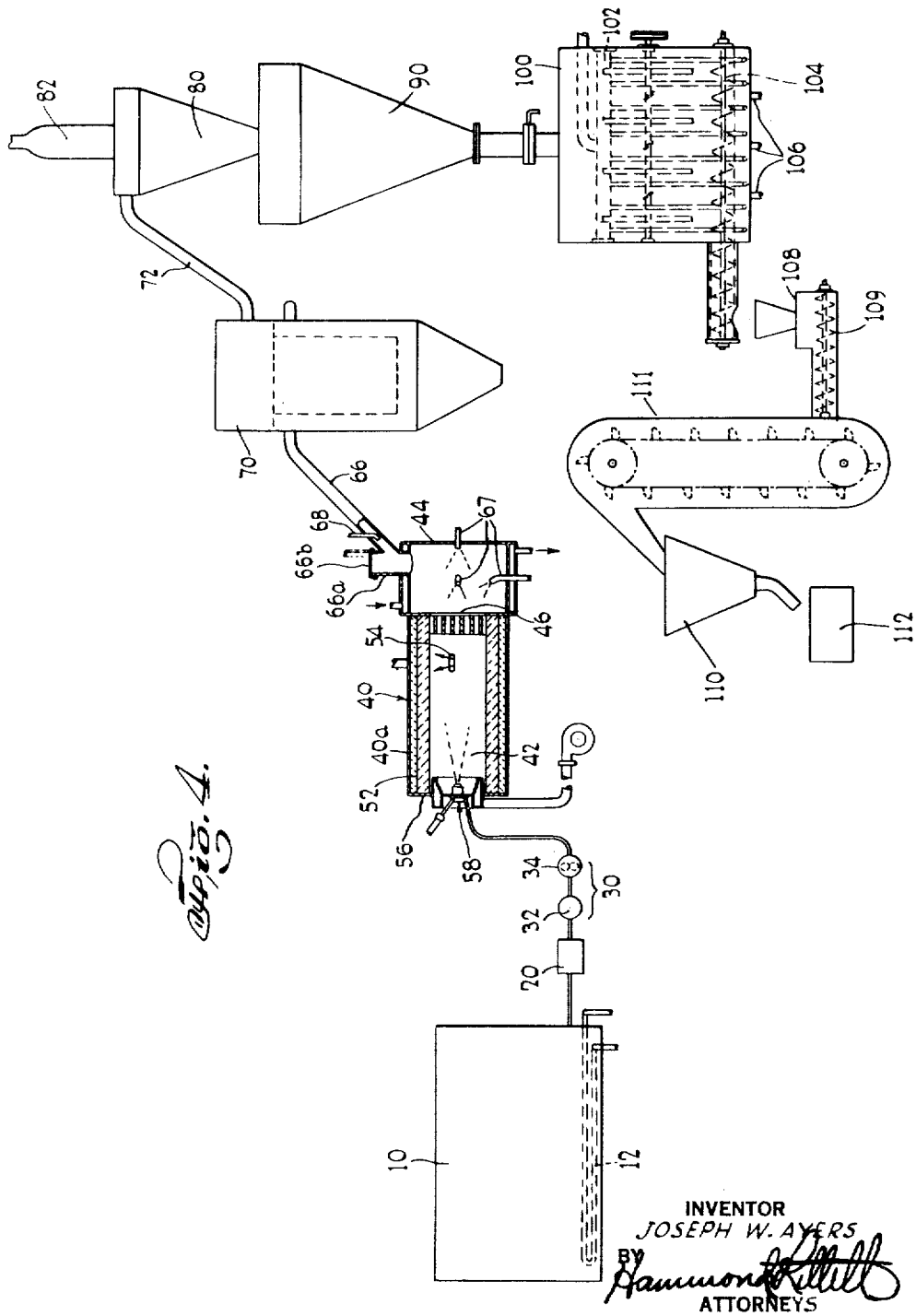

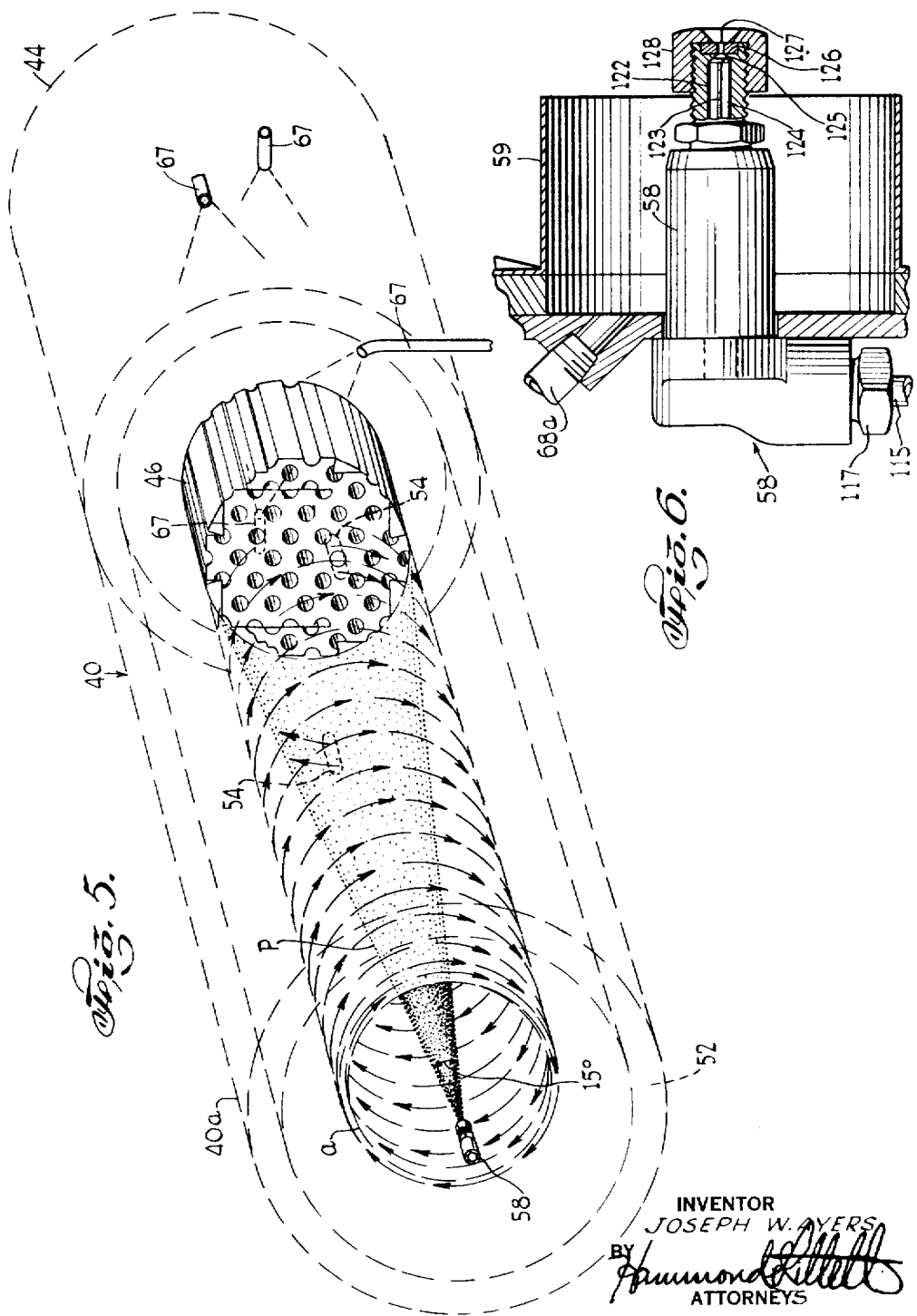

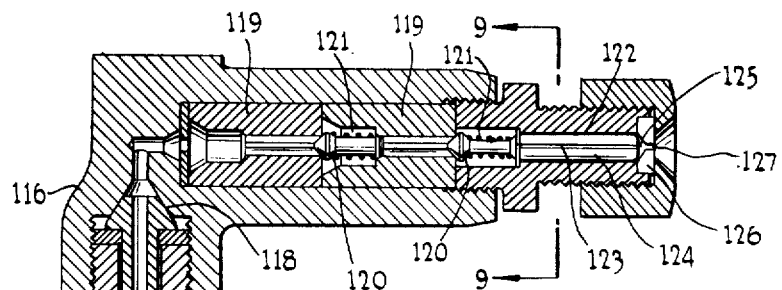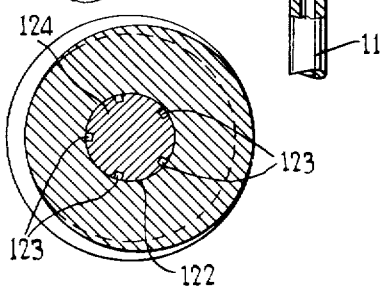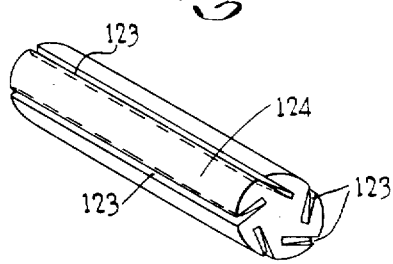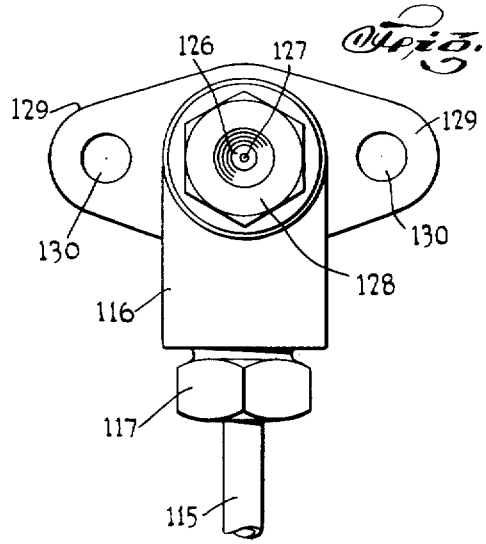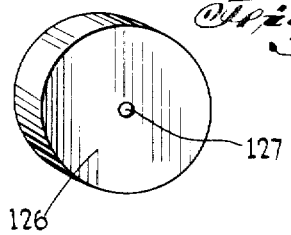

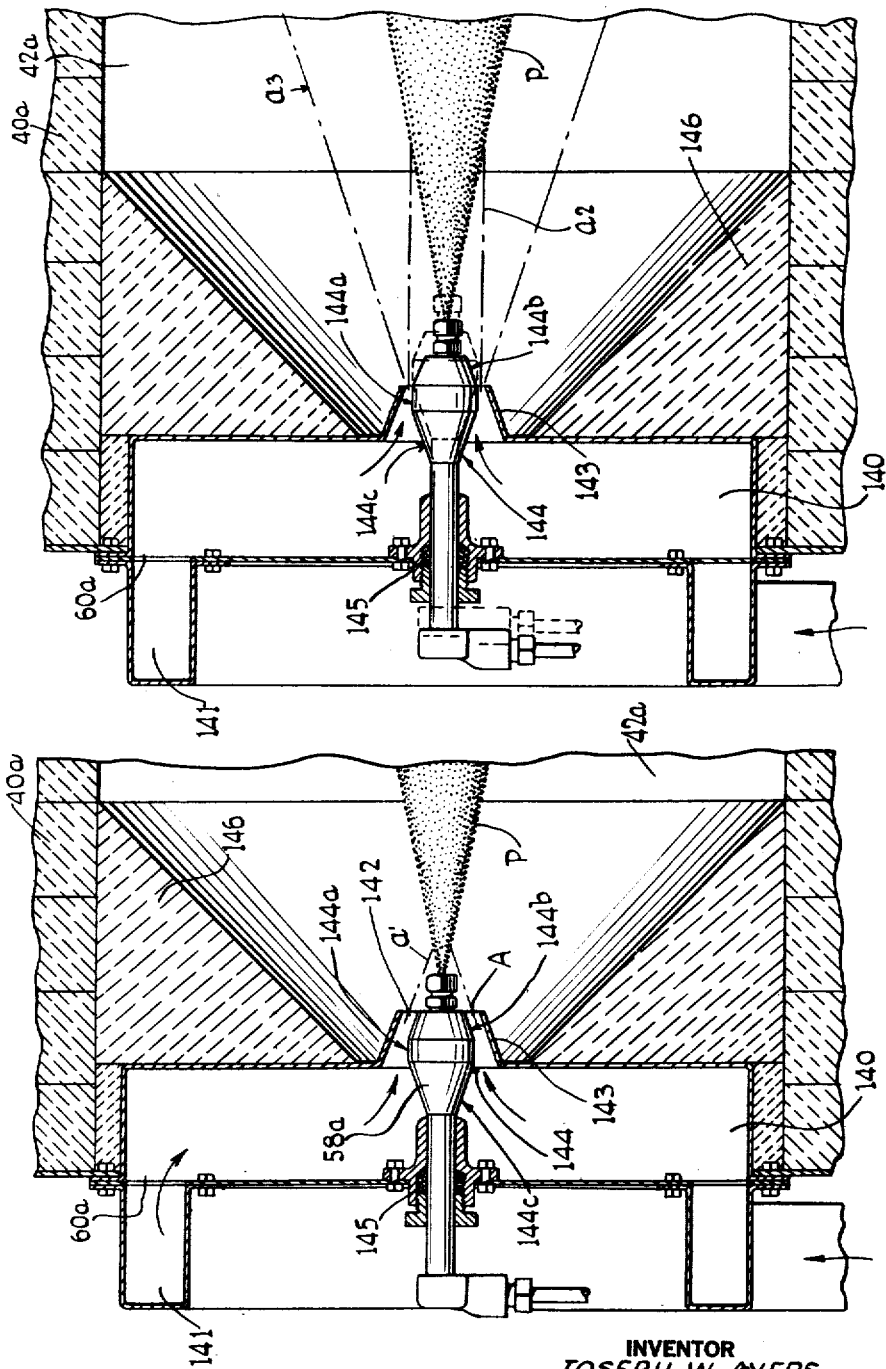

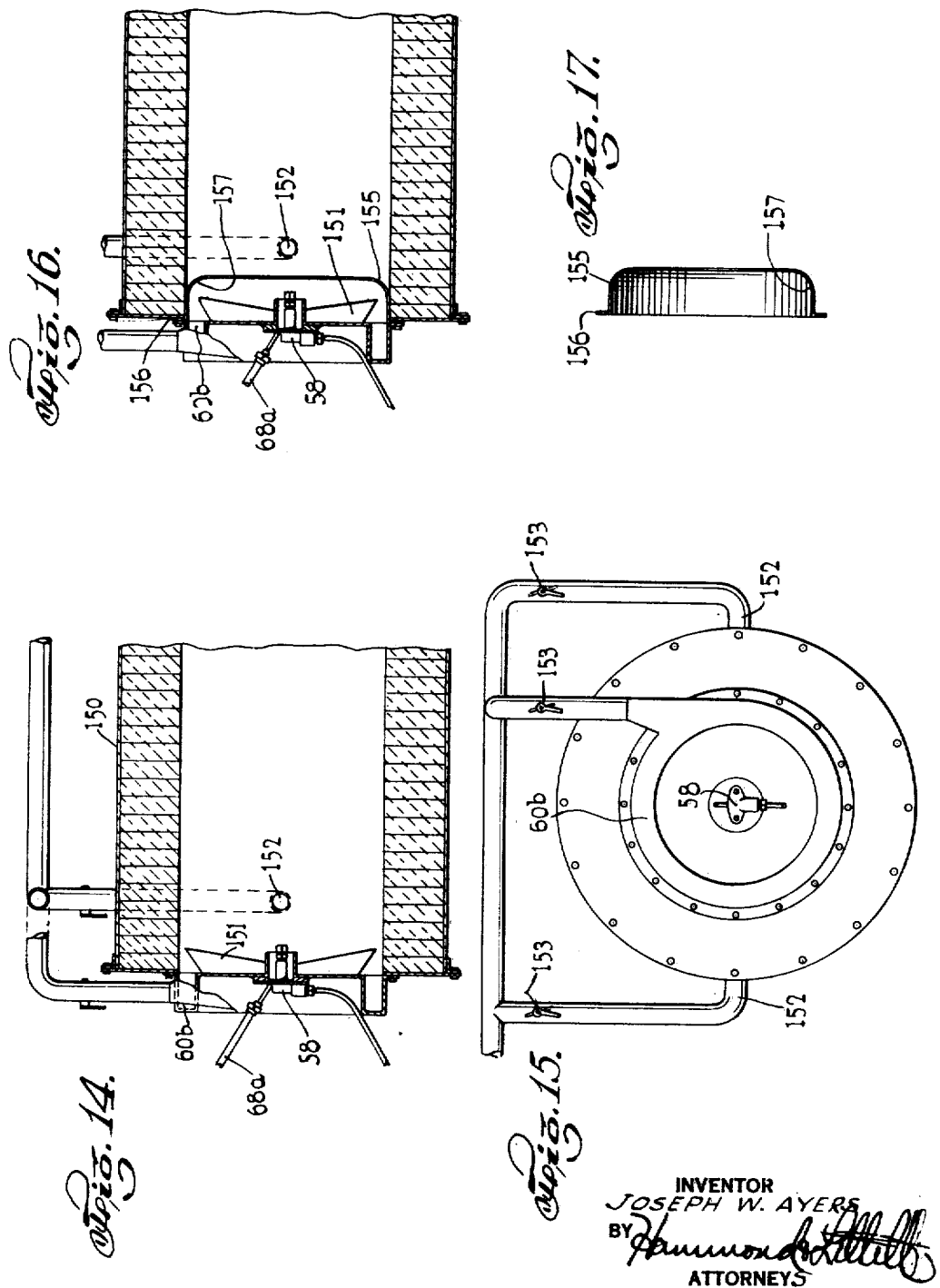

2,420,999

UNITED STATES PATENT OFFICE 2,420,999

APPARATUS FOR THE MANUFACTURE OF AMORPHOUS CARBON

Joseph W. Ayers, Easton, Pa., assignor, by direct and mesne assignments, to Phillips Petroleum Company, Bartlesville, Okla., a corporation of Delaware Application August 11, 1942, Serial No. 454,441

19 Claims. (Cl. 23—259.5)

This invention relates to apparatus for use in the manufacture of amorphous carbon and is a continuation in part of my copending application Serial No. 216,391, filed June 28, 1938, now United States Patent No. 2,292,355.

In the said application, I have described and claimed a process of producing finely divided carbon and also have disclosed apparatus embodying features herein claimed which is adapted for the production of the said finely divided carbon.

The present invention relates particularly to the construction and operation of the retort, in which an improved form of finely divided carbon is produced. It is the object of the invention to provide a retort suitable for the continuous production of finely divided carbon from liquid hydrocarbons, in which retort finely divided carbon of various characteristics can be produced by suitable manipulation of the retort conditions and particularly of the burner and air relations.

Another object of the invention is to provide a retort for the production of finely divided carbon from liquid hydrocarbons, which can be maintained in operation to produce a high yield of carbon from the hydrocarbons fed into the retort and which can be maintained in substantially continuous operation without clogging or other stoppages.

Another object of the invention is to provide a retort construction by which the relation between the air to support partial combustion and the hydrocarbons burned and cracked can be readily changed by relative adjustment of the position of the burner and the air inlets.

In the operation of apparatus herein described, I may use crude petroleum by taking the oil directly from the well, treating it to remove bottom settlings and water, and introducing it into process without intermediate chemical treatment or distillation. One type of oil that can be used is of heavy asphalt base, having an A. P. I. gravity of 9 to 10, a carbon content of about 80%, and about 3% to 5% of gasoline and kerosene. It is characterized for its lack of value for gasoline, fuel or lubricating purposes, and wherever oils of this type are found they are of low cost because they are practically unmarketable excepting as asphalt. Other oils and distillates can, of course, be used, but the more inexpensive the crude material, the cheaper the black produced.

A special advantage of the use of the apparatus herein described is that yields of valuable black totalling between 25% and 40% of the theoretical carbon content of the raw material may be obtained. Another advantage is that blacks of various selected physical qualities may be obtained by adjustments of the retort conditions. Still another advantage, of great importance, is that the apparatus may be used for the production of a new type of lampblack having pigment qualities in many respects superior to those obtainable in any other blacks available on the market.

An important new feature of the operation of the retort consists in the continuous combustion of liquid hydrocarbons to produce valuable black pigments therefrom by forcing a stream of the liquid through a spray nozzle under pressures of several thousand pounds per square inch to produce a high degree of atomization and high rate of vaporization, and introducing the resulting spray of minute particles of oil or vapors into a heated refractory reaction zone of the retort where conditions for partial combustion and cracking of the atomized and vaporized hydrocarbons are maintained. This high pressure atomization of the oil changes it into extremely minute particles, of almost molecular dimensions, and projects them uniformly and at high velocities into the reaction zone of the retort. Combustion of part of the spray and cracking of the vaporized remainder occur immediately upon entrance of the spray into the reaction zone. The highly atomized and vaporized particles cracked under the conditions encountered in the retort are reduced to an elemental form of carbon having unusual and valuable qualities for use in paints, varnishes, inks and the like, and in rubber compounding.

In the retort a part of the hydrocarbons is cracked into elemental carbon, preferably while under superatmospheric pressures, by the heat maintained in the reaction zone through combustion of the remainder of the hydrocarbons with air. The hydrocarbon raw material and a regulated stream of air to support partial combustion are continuously introduced into the reaction chamber and reacted therein to produce finely divided amorphous carbon, and the reacted materials then are discharged continuously from the reaction zone, yet the reaction chamber is maintained at all times under pressures in excess of atmospheric pressure. This feature results in several advantages. At a given temperature prevailing in the reaction zone the hydrocarbon molecules crack much more readily under superatmospheric pressures than under normal pressures, and an increase in the production yield of carbon black is realized. The maintenance of elevated pressures also increases the density of gases, including air, in the chamber, which accelerates the rate of reaction and promotes the production of a carbon pigment of high quality. As the density of the gases increases the particles of oil projected into the chamber undergo a greater shearing action, resulting in greater atomization. In addition, the travel of the spray into the chamber before reaction occurs and the duration of the reaction may be shortened, which I have found to be an important consideration in producing a black of highest quality.

In the operation of the retort, nascent carbon particles are discharged from the reaction chamber in an extremely short interval of time and cooled quickly to a temperature preventing the occurrence of objectionable secondary reactions. In this manner the condition of the carbon is fixed as established in the reaction zone, and a product remarkably free of adsorbed polymerization products and objectionable physical characteristics is obtained. The entire period of time during which the carbon is subject to reactive influences usually approximates one-tenth of a second or less.

The cracking reactions are carried out at high temperatures which may be varied with the quality of black being produced. For a low grade black, judged upon the jetness of the mass tone and the degree of tinting strength, the retort temperature is maintained at approximately 1500° F. For a medium grade black, the temperature is maintained between 2200° F. and 2300° F., and for a high grade black, the temperature of the retort is maintained at approximately 3000° F. The percentage yield of carbon varies inversely with the color grade or reaction temperature being maintained, and the temperature is varied by changing the ratio of air flow to hydrocarbon flow into the retort.

In the use of the apparatus, the liquid hydrocarbon of suitable fluidity is passed in a stream through a pumping system capable of forcing it under a high pressure through the injection nozzles into the retort. Pressure in the neighborhood of two thousand pounds per square inch is preferred for best results, but a reduction considerably below this point may be made without departing from the broader principles of the invention, particularly when operating on distillates or high gravity crudes. The essential consideration is to get a high degree of atomization and high rate of vaporization of the material sprayed into the retort. From the pumping system the oil under high pressure goes directly to the spray nozzle or injector of the retort for introduction into the reaction chamber. The highly atomized spray from the injector enters the heated refractory reaction zone simultaneously with a stream of air, the direction and angle of the spray and the flow of air preferably being controlled so that impingement of unreacted liquid particles of oil against walls of the reaction chamber is avoided. The zone of reaction is continuously maintained at a high temperature by combustion of part of the vaporized oil. As the spray enters this zone, combustion and cracking reactions occur almost instantaneously. Thereupon the reacted materials, including a large proportion of elemental carbon, are continuously and quickly discharged from the reaction chamber and immediately subjected to cooling influences at the discharge end of the retort.

Superatmospheric pressures are maintained in the reaction chamber during the operation by several contributing factors. The projection of the oil through the spray nozzle under extreme pressures is one factor. The introduction of air for partial combustion is another, which is preferably effected, at least in part, by passing air under pressure through a restricted annular orifice at the entry end of the chamber. Combustion and cracking reactions in the reaction zone multiply the volumes of gases in the chambers. In addition to the above, a supply of inert gaseous fluid may be continuously maintained under superatmospheric pressure adjacent the discharge end of the reaction chamber so as to exert a back pressure and keep the pressure in the reaction chamber at a minimum of several pounds per square inch above atmospheric pressure. This back pressure is obtained, for example, by forcing steam under pressure into the back, or cooling chamber, of the retort. Another procedure is to spray water thereinto, which immediately vaporizes at the prevailing high temperatures. The steam serves the double purpose of keeping the pressure and activity within the reaction chamber at a proper balance, and it cools the reacted carbon particles immediately upon passing through the perforate checkerwork constituting the end wall of the reaction chamber.

It is important, in operations for the continuous production of high grade black, that the heat generated by combustion in the retort be conserved and distributed within the reaction zone as uniformly as possible. To this end, I have found it desirable to employ a high ratio of heat-radiant surface to volume of gases, enclosing the zone of reaction closely within the refractory walls of the reaction chamber and locating it as close to the end wall thereof as feasible without permitting unreacted oil particles to impinge on said wall.

The end wall of the reaction chamber, usually consisting of a perforate refractory checkerwork, provides heat insulation at the back of the reaction chamber and also enough free space for the gases and suspended products from the reaction chamber to pass directly into a cooling zone where they are quickly reduced to a non-reactive temperature and from which they are carried away by the pressure of the system, while still hot.

In the accompanying drawings:

Figure 1 is a detailed showing of one form of the retort constituting my invention;

Figure 2 is an end view of said one form of retort;

Figure 3 is a sectional view through one of the retorts on the line 3—3 of Figure 1 and showing the auxiliary air inlets in the cylindrical side wall and a refractory checkerwork constituting the end wall;

Figure 4 illustrates diagrammatically one plan of embodiment of a plant in which retorts of the type herein described are used;

Figure 5 is a diagram in perspective illustrating the combustion conditions in one of the retorts;

Figure 6 is a detail view illustrating one form of injector nozzle for injecting the oil under high pressure into the retorts;

Figure 7 is a detail sectional view of one form of injector nozzle;

Figure 8 is a detail perspective view of a nozzle the vane member to assist breaking the oil into a fine spray;

Figure 9 is a sectional view on the line 9—9 of Figure 7 showing the vane member in position in the nozzle;

Figure 10 is an end view of the nozzle;

Figure 11 is a perspective view of one of the replaceable refractory nozzle tips for maintaining a uniform spray pattern for the oil;

Figure 12 is a detail view showing a modified form of air header construction and adjustable oil injector nozzle which permits the oil spray pattern and air distribution to be controlled by adjustment of the injector nozzle;

Figure 13 is a view similar to Figure 12 showing the oil injector nozzle in a different position of adjustment;

Figure 14 is a sectional view of a modified form of retort showing a different arrangement of the air and oil inlets;

Figure 15 is an end view of the retort of Figure 14;

Figure 16 is a sectional view showing a still further modification of the air distribution inlets; and Figure 17 is a sectional view of a part of the air distributors.

The plant arrangement illustrated in Figure 4 includes, as the principal units of equipment, a storage tank 10 in which a supply of the liquid raw material is kept ready for use in the plant, a preheater 20, pumping system 30, a furnace or retort 40, precipitator or filter 70, cyclone separator 80, cooling hopper 90, drier 100 and storage bin 110. Each of these units may be of various types, or in multiples where necessary. In addition, various other items of equipment may be employed in a complete plant for practicing the invention, some of which are referred to below.

The storage tank 10 may include steam coils 12 therein for raising the temperature of the oil to a point where it will flow by gravity before introducing the same into the plant. Preheater 20 heats the oil to a selected temperature or range of temperatures, preferably between 150° and 500° F., by the use of combustible gas, electricity, steam or other suitable heating medium.

The pumping system 30 in the illustrated embodiment includes a low pressure pump 32, operating at pressures of twenty-five to fifty pounds per square inch, and a high pressure pump 34, for example a Triplex pump, which advances the stream of crude oil to the retort nozzles under pressures in the order of two thousand pounds per square inch, although this will depend upon the nature of the oil used. Pump 32 feeds a regular stream of oil to the high pressure pump 34.

The stream of oil from pump 34 goes directly to the retort 40, to be described more particularly hereinafter. A continuous stream of gases and suspended fine carbon particles pass from the cooling chamber 44 of the retort 40 through conduit 66 and into precipitator 70, which can be an up- or down-draft precipitator but is preferably a down-draft precipitator of the Cottrell type embodying means for electrostatically flocculating minute particles of carbon in the gases. In lieu of an electrical precipitator, it will be understood that other means for removing or flocculating the fine carbon particles may be used, or that discharging filters of temperature-resistant material, such as glass cloth, may be used.

The gases and suspended carbon, after treatment in the precipitator, pass through a conduit 72 and into the cyclone 80, where carbon is separated from the gases and discharged into hopper 90 and the gases and steam are vented through a flue or stack 82. The entire system, from the retort to and including hopper 90, is maintained under positive pressure and protected against access of air so as to prevent spontaneous combustion of the carbon, which is still quite hot when it reaches the hopper.

Beyond hopper 90 additional apparatus preferably is provided for further treatment of the product. A drying bin 100 is located to receive black from hopper 90. This bin includes heating means 102 and agitating and conveying means 104. Conduits 106 enter the bottom of the bin and accommodate a supply of compressed air, used for drying. Material received in bin 100 from hopper 90 is thoroughly agitated and blown with air, while being heated, to remove steam or entrapped moisture therefrom. The material is kept above the dew point until discharged from the bin 100. A continuous stream of black which has been treated in this manner is fed from the bin 100 by the conveyor means 104. A pulverizer 108 receives dried black from bin 100, and from the pulverizer the material is passed onward by a conveyor 109 and elevator 111 and introduced into the storage bin 110. Here it remains until withdrawn and introduced into packing apparatus 112 for packing into bags for shipment.

While I have illustrated a preferred system and apparatus for handling and recovering the carbon black after its formation in the retort 40, it will be understood that any system and apparatus which will cool and recover the carbon particles may be used in lieu of the specific parts 70, 80, 90 and 100 illustrated, and that the construction and operation of the retort is the essential feature of the present invention.

The retort 40, illustrated particularly in Figures 1, 2 and 3, is preferably composed of an outer metal shell and an inner brickwork forming a refractory reaction chamber 42 and a cooling chamber 44. The two chambers communicate through openings 48 in a perforate refractory end wall, or checkerwork, 46, of firebrick or the like, at the discharge end of the reaction chamber. The entire retort is enclosed within a sheet metal casing 50.

The side walls of chamber 42 are formed of thick brickwork or refractory material 52 which is capable of withstanding temperatures of 3000° to 3500° F. or higher for long periods of time. Auxiliary air inlets may be provided in the walls of the retort by oppositely disposed slotted openings 54 through which part of the air for combustion may be introduced tangentially into the reaction zone of the combustion chamber.

Means are provided at the entry end of the retort for mounting an injector or spray nozzle in axial alignment therewith and for introducing an annular stream of air under pressure into chamber 42. The forward end wall 56 includes a central opening which receives and mounts the spray nozzle 58, to which oil of suitable fluidity is forced by the high pressure pump 34. Wall 56 also provides an annular header 60 having a feed conduit 62, for air under pressure, entering thereinto tangentially and a restricted annular orifice 64 for directing an annular stream of the air into and along the walls of the reaction chamber. The structure forming orifice 64 preferably includes vanes 64a for imparting a spiral, swirling motion to the annular stream of air entering the retort.

The cooling chamber 44 at the discharge end of the retort is left uninsulated, and it preferably is enclosed by a water jacket 65 which assists in cooling the chamber and reducing materials therein to non-reactive temperatures. A discharge conduit 66 leads from the chamber 44 to carry gases and suspended carbon therefrom into the collection system here illustrated as precipitator 70, etc. A plurality of nozzles 67 may be provided in chamber 44, and additional nozzles 68 in conduit 66, for introducing steam thereinto and maintaining the desired back pressure in chamber 44 and the rear end of the reaction chamber 42.

An example of operation of the apparatus is as follows:

A stream of heavy crude oil is continuously withdrawn from storage, and, if necessary, heated to a temperature between about 150° and 500° F. to impart fluidity, and then pumped to the spray nozzle 58 of the retort under pressures preferably of the order of about 2,000 pounds per square inch. The stream of liquid hydrocarbon is forced through the nozzle and into the retort 40 under such pressures as are required to convert the particular oil used into a continuously uniform spray composed of very fine particles and oil vapor. Simultaneously, air under pressure, for example, about twelve pounds per square inch or greater, and in an amount regulated to effect the desired incomplete combustion, is pumped into the header 60 at the entry end of the retort and thence through the restricted annular air orifice 64. Part of the desired quantity of air to give partial but incomplete combustion of the hydrocarbons may be passed into the reaction chamber at other points therein, as, for example, the auxiliary air inlets 54.

The air circulation follows the inside wall of the reaction chamber preferably with a spiral motion, while the highly atomized spray of oil is injected into the reaction zone of the chamber in a circular or cone shaped pattern toward the perforate checkerwork at the discharge end of the reaction chamber. During passage through the retort the atomized oil spray mingles uniformly with air and is vaporized and reacted almost instantaneously to crack and partially burn the hydrocarbons to a form of elemental carbon. In operations the reaction zone of the retort remains at a substantially uniform temperature of the order of 1500° F. to 3000° F., depending upon the quality of black being produced, and the products sweep through the reaction zone at a high rate of speed.

As described, particularly with reference to Figures 12 and 13, the relation of the oil spray and the air inlet can be varied to regulate the point of combustion and place it at the burner nozzle or a distance of two or three feet inside the retort. Also, by changing the air inlet, the actual carbon producing flame can be held in from the sides of the retort or forced out, so that the radiant heat from the retort walls will have a greater effect on the cracking.

The products of reaction, including gases and suspended carbon particles, continuously pass through the perforate refractory end wall of the reaction chamber and into the cooling chamber, thereby automatically and continuously clearing the retort of carbon and preventing coking or choking of the retorts. The oil remains in contact with reactive influence only about one-tenth of a second or less, during which period the vaporization and cracking or partial combustion of each minute oil particle is completed, and the dry carbon and gases of combustion are swept out of the reaction zone and into the cooling chambers. In the cooling chambers they are reduced immediately to a non-reactive temperature, for example, about 1000° F., thereby preventing further reaction or combustion of the carbon particles, and then discharged through the exhaust conduit into the flocculator or precipitator 70, and thence carried on through the plant.

In order to give more selective control over the combustion conditions in the retort and to control and vary the quality of carbon produced by the process, means to adjust the position of the oil injector nozzle and air pattern may be provided as indicated in Figures 12 and 13.

In this form of embodiment the retort 40a is constructed substantially as illustrated in Figure 2, except that the auxiliary air inlets 54 may be omitted if desired. The forward end of the retort is fitted with a modified form of an inlet head 60a in which the air is introduced toward the outside of a drum-like casing 140 through an annular header 141 under a substantially higher pressure than described above and flows toward the center of the head 60a where it enters the retort chamber 42a through the opening 142 around the injector nozzle 58a.

The opening 142 is formed with a flared inlet 143 and the oil injector nozzle 58a is made adjustable in three positions and is provided with an enlargement 144, which cooperates with the flared inlet 143 from the casing 140 to determine the direction of the air stream into the retort and the place of impingement of the air stream A on the oil stream P. The enlargement 144 on the nozzle 58a is provided with a cylindrical central portion 144a, a forwardly sloping conical portion 144b and a rearwardly sloping conical portion 144c, so that when the nozzle 58a is adjusted to its rearward position in the stuffing box 145, as illustrated in Figure 12, the forwardly sloping conical portion 144b is opposite the flared inlet 143 for the air and the air stream is directed in an inwardly sloping conical path $a^1$ to impinge on the oil stream P at a point near the outlet from the nozzle 58a. When the nozzle 58a is in the middle or full line position illustrated in Figure 13, the air stream is directed in a substantially parallel path $a^2$, indicated by dash lines, to impinge on the oil stream P at a point further removed from the end of the nozzle 58a, and when the nozzle 58a is in the forward position illustrated in dash lines in Figure 13, the air stream is directed in an outwardly flaring cone $a^3$ to impinge on the oil stream farther away from the end of the nozzle 58a.

In each of the three positions of the nozzle 58a, the place and the direction at which the air stream strikes the oil stream is different, which brings about a difference in the period of contact of the oil and air, and a difference in the currents set up due to the intensity and direction at which the air strikes the oil. By varying the position of the nozzle 58a, different conditions are created by which the quality of the carbon black produced may be changed. Thus, by manipulation of the air distribution, the actual point of combustion of the oil can be varied from the end of the burner nozzle to two or three feet inside the retort; also by manipulation of the air stream pressure, etc., the actual carbon producing flame can be held in from the sides of the retort or forced out, so that the radiant heat from the retort walls will have a greater effect on the cracking. In order to reduce eddy currents in the retort, the corners adjacent the air header may be filled with refractory material 146.

In the embodiment illustrated in Figures 14 and 15, the air enters a manifold 60b and is caused to sweep along the walls of the retort 150 by a refractory metal baffle 151 which surrounds the burner. Auxiliary air inlets directed radially into the reaction zone may be provided at 152 as a secondary means of adjusting the combustion conditions within the retort to vary the quality of the black produced. Dampers or valves 153 located in the air conduits facilitate control of the rate of air supply to each point of entrance into the reaction chamber, as well as control of the pressure at which the air is introduced. In this embodiment the use of a separate cooling chamber in the end of the retort may be omitted and the products of combustion may be taken directly into a discharge conduit such as stack 66 if the retort is properly operated.

In the embodiment illustrated in Figures 16 and 17, an air distributing guide 155 is used to direct the flow of air within the retort. The guide 155 is provided with a flange 156 by which it may be secured to the end wall of the retort, and with a curved face 157 for guiding the air toward the center of the retort. In practice a series of guides 155 are provided, each with a different degree of curvature on the face 157 so that by changing from one guide to another a different distribution of the air stream within the retort may be secured.

It will be understood that the particular practices mentioned above are described by way of illustration and not as limitations. For example, I have prepared a liquid hydrocarbon raw material by adding about 30% of petroleum distillate to an asphalt base crude from which base settlings and water have been removed and have obtained a black of very high quality by spraying this material into a cracking retort under atomizing pressures of between 2000 to 3500 pounds per square inch, without preliminary heating. It is also possible to use distillates or any other oil, and to control the relation of the air and oil stream in other ways than those specifically described. The pressure at the oil nozzle should be sufficient to effect fine atomization and vaporization of the oil particles to break them down into a sufficiently minute state of subdivision to insure that each particle will be immediately vaporized and then properly combusted or cracked in the short time it is in the reaction zone, and the relation of the oil stream and the air stream should be so regulated as to get the maximum yield of carbon without permitting uncombusted oil particles reaching the walls of the retort or the back, as uncombusted or liquid oil particles reaching these portions of the retort are likely to cause the building up of carbon and choking of the retort. A large variety of liquid hydrocarbon raw materials may be used, and considerable variation in atomizing pressures and relation of oil and air streams may be resorted to.

It is important that each oil particle be combusted to the desired degree of partial combustion before any particle of liquid oil reaches the walls or the checkerwork or back end of the retort. Where the degree of atomization is not sufficient to vaporize or break the oil particles sufficiently small that each can be burned before reaching the walls or end of the retort, or where the relation of the oil stream and air stream is not properly adjusted, these unburned or liquid particles of oil begin to build up and burn on the walls or in the checkerwork of the retort and start the formation of carbon deposits which cling to the walls and quickly build up to the point where they will choke the retort necessitating dismantling the same and removal of the carbon deposits. Where, however, the proper degree of atomization is obtained, and a uniform oil spray pattern and conditions of air distribution are maintained which prevent unburned or liquid hydrocarbons reaching the side walls or checkerwork of the retort, it is possible to operate the retort for months, or, in other words, continuously, without the necessity for stoppage due to carbonization or choking up.

For this reason, it is necessary to have a high degree of atomization or fine subdivision of the oil particles, and a uniform distribution of these particles in the oil spray pattern, and, as will be described later, if the tip of the atomizing nozzle becomes worn or out of true because of wear due to the high pressure at which the oil is projected therethrough, it becomes necessary to replace this defective tip with one which produces a uniform spray pattern as well as a high degree of atomization, because if too many of the oil particles are thrown to one side of the reaction zone, they cannot all be burned on this side of the zone even with manipulation of the air in the short time they have to travel from the end of the nozzle toward the walls of the retort and hence some unburned or liquid oil particles will reach the sides of the retort and start the coking or choking up of the retort. An ununiform spray pattern will also produce an ununiform poor quality carbon.

In another way of practicing my invention, such as illustrated for example in Figures 12 and 13, I may introduce the air into the reaction chamber under pressures greatly in excess of that mentioned specifically above. This has the advantage of increasing the air velocity to a point more closely approximating the velocity of the atomized oil, which improves the distribution of oil and air in the reaction chamber and, with the adjustable injector nozzle 58a, permits greater freedom in regulating the process. It also permits an increase in the density of gases within the chamber and increases the percentage of oxygen and the shearing or breaking up action between the oil particles and the gases in the reaction zone, thus improving the efficiency of the process and the quality of the product. Thus by increasing or decreasing the air pressure and shifting the position of the nozzle 58a, the point of first impingement of the air stream on the oil stream and the width or narrowness of the carbon producing flame can be varied, to bring the flame nearer to or farther from the walls of the retort which are maintained at a temperature of around 1500° F. to 3000° F. In this way the time the oil particles are heated in the reaction zone and the degree of heat and pressure may be regulated throughout a wide range to increase or decrease the amount of carbon produced per unit of oil and to regulate the quality of the carbon.

As I have attempted to illustrate graphically in Figure 5, the oil spray from the nozzle 58 takes a cone shaped pattern P, in which the liquid and vaporized oil particles are indicated as dots of greatly exaggerated size, travelling from the nozzle 58 toward the checkerwork 46 at the end of the reaction zone. The angle of the spray from the end of the nozzle 58 is preferably about 15° and the direction of the air, indicated by the swirling lines a, brought about by its introduction in a swirling manner at the inlet 64 and by the direction of the auxiliary air inlet nozzles 54 is to cause a spiral swirling of the air around the pattern P of the cone of oil particles to insure uniform combustion thereof before any unburned or liquid particles of oil have reached the walls or checkerwork of the reaction zone. If no air is introduced through the nozzles 54, it will be understood that the air and gases will travel toward the back of the reaction chamber with less spiral motion. In the embodiments of Figures 14 and 16, where the side air streams from 152 enter in a radial direction, the travel of the reaction products may approach a straight line motion, although a spiral motion of the head air supply before and at the zone of its impingement with the stream of vaporized hydrocarbons from 58 may be provided by the tangential feed of air into header 60b.

In order to retard the speed of the oil particles as they approach the checkerwork end wall of the reaction zone, and to prevent unburned or liquid oil particles from impinging upon this hot checkerwork where they would form hard particles of carbon and begin to choke the retort, I introduce sufficient steam through the nozzles 67 and under sufficient pressure into the cooling chamber 44 to create a back pressure of approximately seven pounds per square inch adjacent the checkerwork end of the reaction zone. This is sufficient to retard the speed at which any unburned oil particles approach the checkerwork and to insure that any such unburned oil particles will be retarded and burned before reaching the checkerwork, but at the same time it is not sufficient to stop the flow of the combustion gases and carbon particles through the checkerwork and into the cooling chamber 44 where they encounter more steam and are cooled below the zone of further reaction before being discharged through the conduit 66.

By properly balancing the pressures of the air and the relationship of the air stream to the oil injection stream and the steam, it is possible to keep the oil particles in the reaction zone long enough to burn them to the desired degree of incomplete combustion to break down the hydrocarbons to form a very good form of carbon black with a high yield and still remove or sweep the carbon particles out of the reaction zone before undesired secondary reactions take place. At the same time, the process may be operated continuously without coking or choking of the retorts and without shutting down to remove the formed carbon as with the prior lampblack processes.

As illustrated in Figures 1 and 6, the oil nozzle 58 is shielded by a surrounding collar 59 and an additional air inlet 68a supplies air adjacent the burner tip to keep the burner tip cool. In Figures 12 and 13, the burner tip is cooled by the passage of air through the orifice 142.

In order to have fine atomization of the oil particles, a special oil nozzle with a replaceable tip is used, to permit replacement of the tip when it becomes so worn or distorted as to throw an ununiform spray pattern. While the oil nozzle may be constructed in various forms to atomize the heavy oil at high pressures, a particularly suitable oil nozzle is illustrated in Figures 6 to 11, inclusive.

In the form of oil nozzle here illustarted, the oil enters the nozzle through the conduit 115 which is adapted to carry oil under a high pressure, and is firmly secured in the nozzle holder 116 by a threaded collar 117 which forces the flanged and beveled end of the conduit 115 firmly against a seat 118 in the holder 116. From the end of the conduit 115, the oil flows through an opening in the holder 116 and through the openings in the removable valve seats 119 and past the check valves 120, which are kept seated by the springs 121, to the whirler chamber 122, where it flows through slots 123 in a whirler 124 to the forward end thereof, where each slot 123 terminates in a radially directed passage which discharges the oil with a circular motion or whirl into the cone shaped passage 125 in a replaceable insert 126 at the end of the whirler chamber 122. At the forward end of the whirler chamber 122 the replaceable insert 126, provided with a passage 127 and conical opening 125, is held in place by a threaded hexagonal collar 128, so that the insert 126 may be readily removed and replaced if, due to the passage of oil under high pressure therethrough, the passage 127 should become worn so as no longer to provide a uniform spray pattern for the oil discharged from the nozzle 58. The entrance 125 into the passage 127 in the insert 126 is counter-sunk to provide a cone shaped passage by which the angle of the oil spray P is controlled. It is important that the outlet end of the passage 127 be such as to provide a uniform spray pattern for the oil entering the retort.

The nozzle 58, as illustrated in Figures 6 to 11, is provided with wing extensions 129, having openings 130 therethrough, by which the nozzle may be removably secured to the end wall of the retort by means of stud bolts 131 to permit easy removal. By suitable adjustment of the bolts 131 the nozzle 58 may be projected a greater or lesser distance through the end wall of the retort. In Figures 12 and 13, the nozzle 58a is adjustably mounted in a stuffing box 145.

While other forms of nozzles capable of atomizing oil into a uniform spray pattern at high pressures may be used, I have found the nozzles described above to be suitable for this purpose.

The removable insert tip 126 is preferably made of hardened steel or other hard alloys, either ferrous or nonferrous, to resist abrasion of the oil particles discharged therethrough under high pressure and to resist deformation at high temperature. Operating at a pressure of 4000 to 6000 pounds per square inch on heavy asphaltic crude, I have found that hardened steel inserts 126 will give a uniform spray pattern for about three weeks continuous operation before becoming so worn as to throw the spray pattern out of round. At lower pressures the wear is, of course less.

In starting operation of the retort 40, it is preferable to preheat it to a temperature in excess of 1000° F. using sufficient air to provide complete combustion of the materials burned in the retort before starting the high pressure oil and air streams. This may be done in many ways, either by the use of a special oil burner preheater or by stoking the retort with wood and igniting and blowing air therethrough to secure the desired preheat temperature. In order to prevent the products of combustion from the preheating operation from passing through the precipitator, cyclone, etc., and possibly contaminating the carbon black later produced, I provide the retort with a stack 66a having a lid or closure 66b which can be opened to permit the products of combustion to escape during the preheating operation but which can be closed and sealed down during regular operation.

The apparatus herein described produces a new type of lampblack having qualities greatly superior to other lampblack heretofore known in the art and in several respects superior to channel black. This lampblack produced is remarkably free of adsorbed organic polymer materials, as shown by acetone or benzene extraction tests. Its oil absorption capacity is only about 50% of that of other blacks on the market. It is notable for its high tinting strength in paints, varnishes and the like, and its uniform high color tone, which is characterized by an unusual clear blue tone. The new lampblack also possesses improved pigment qualities for use in rubber compositions. Standard rubber tests comparing it with channel black show that the new material imparts a higher modulus of elasticity, greater abrasion resistance and better flexing qualities to rubber than channel black. The rate of cure of a rubber composition including this material is much higher than in the case of channel black.

While I have illustrated a round retort as providing the simplest form of construction and control, it will be understood that other shapes could be used if arranged and operated so as to maintain uniform conditions like those secured with the cylindrical form. Many possible variations in raw materials, pressures, temperatures and in the construction and operation of the apparatus will become apparent to skilled workers in this art upon reading the foregoing description. I therefore desire that the invention be accorded a scope fully protecting its various new features and embodiments and commensurate with its broad departure from the prior art as intended to be defined in the appended claims.

I claim:

1. Apparatus for producing finely divided carbon comprising a retort having a cylindrical heat-insulating heat-radiant side wall closely surrounding and defining an elongated reaction zone adapted to be maintained at hydrocarbon cracking temperatures, an end wall at the front of said zone having coaxially with said side wall a hydrocarbon injector adapted to supply a stream of hydrocarbons axially into said zone, air introduction means including an annular air inlet surrounding said injector adapted to provide in said zone an annular air stream surrounding the hydrocarbon stream so that the hydrocarbons and the air of said streams may mingle and react within said zone, said annular inlet having coaxial annular air-guiding elements spaced apart in radial direction and relatively adjustable in axial direction, at least one of said elements having a plurality of annular surfaces disposed at different angles to its axis and operative in different positions of relative axial adjustment of said elements to impart predetermined different angles of entrance to said annular air stream in respect to the axis of said reaction zone, and means to set said elements in any selected one of said positions whereby to change the location of reactions between the air and hydrocarbons within said zone, a heat-radiant refractory wall across the rear of said zone having passageway therein for discharging reaction products from said zone, a heat-dissipating enclosure extending beyond the last recited wall in communication with said passageway through which to pass and in which to cool the discharged products, and means beyond and connected with said enclosure for collecting carbon from said products.

2. Apparatus for producing finely divided carbon from liquid hydrocarbons comprising a retort having a cylindrical heat-insulating heat-radiant side wall and walls across the front and the rear thereof defining therewithin an unobstructed cylindrical reaction zone adapted to be maintained at hydrocarbon cracking temperatures, said rear wall being of heat-radiant refractory material and having passage-way therein for discharging reaction products from said zone, a hydrocarbon atomizing spray nozzle disposed coaxially with said side wall at the front of the retort and directed axially into said zone, means including a high pressure pump connected with said nozzle and adapted to force liquid hydrocarbons through said nozzle and thus produce a highly disintegrated axial hydrocarbon stream susceptible to immediate vaporization, combustion in part and cracking in part to carbon by heat and oxygen within said zone, air introduction means including circumferential air inlets directed into said zone and adapted to form therein an air stream surrounding and impinging and reacting with the hydrocarbon stream to maintain the partial combustion and cracking of the hydrocarbons, a heat-dissipating enclosure extending beyond said rear wall in communication with said passageway through which to pass and in which to cool said reaction products, and means beyond and connected with said enclosure for collecting carbon from said products.

3. Apparatus for producing finely divided carbon from hydrocarbons comprising a retort having an elongated cylindrical reaction chamber adapted to be maintained at hydrocarbon cracking temperatures and bounded by a cylindrical heat-insulating heat-radiant side wall, means including a hydrocarbon injector disposed at one end of said chamber coaxially with said side wall for providing an axial stream of hydrocarbons in said chamber, and air introduction means comprising at least one inlet directed tangentially into said chamber and adapted to form therein a spirally moving annular air stream surrounding said stream of hydrocarbons so that the hydrocarbons and the air within said chamber mingle and react therein in a swirling condition, a heat-dissipating enclosure communicating with the other end of said reaction chamber through which to conduct and in which to cool the reaction gases and suspended carbon, and means beyond and connected with said enclosure for continuously collecting the carbon.

4. Apparatus for producing finely divided carbon from hydrocarbons comprising a retort having an elongated reaction chamber adapted to be maintained at hydrocarbon cracking temperatures and bounded by a cylindrical heat-insulating heat-radiant side wall and a perforate heat-radiant refractory wall at one end of said chamber through which to discharge reaction products therefrom, means including a hydrocarbon injector disposed at the other end of said chamber and directed axially thereinto for providing an axial stream of the hydrocarbons therein, and air introduction means including a plurality of air inlets directed into said chamber substantially tangent to the inner surface of said side wall to provide a spirally moving air stream in said chamber surrounding said hydrocarbon stream so that the hydrocarbons and the air within said chamber mingle and react therein a swirling condition.

5. Apparatus for producing finely divided carbon from hydrocarbons comprising a retort having an elongated reaction chamber adapted to be maintained at hydrocarbon cracking temperatures and bounded by a cylindrical heat-insulating heat-radiant side wall, means including a hydrocarbon injector mounted at one end of said chamber and directed thereinto coaxially with said side wall for providing an axial stream of hydrocarbons in said chamber, and air introduction means including a plurality of air inlets extending symmetrically through said side wall and directed tangentially into said chamber to provide therein a spirally moving air stream surrounding said hydrocarbon stream so that the hydrocarbons and the air within said chamber mingle and react therein in a swirling condition.

6. A retort for producing finely divided carbon from hydrocarbons comprising a cylindrical heat-insulating heat-radiant side wall defining an elongated reaction chamber therewithin adapted to be maintained at hydrocarbon cracking temperatures, means including a hydrocarbon injector at one end of said chamber directed axially thereinto for providing therein an axial stream of the hydrocarbons, an annular air header surrounding said injector at said one end and having a restricted annular passage directed into said chamber and adapted to deliver air thereinto in an annular stream surrounding the hydrocarbon stream, an air intake extending tangentially into said header, and means adapted to feed air under pressure through said tangential intake into said header.

7. In an apparatus for producing finely divided carbon from hydrocarbons, a retort having a cylindrical heat-insulating heat-radiant side wall defining an elongated reaction chamber therewithin adapted to be maintained at hydrocarbon cracking temperatures, means including a hydrocarbon injector disposed adjacent one end of said chamber and directed thereinto coaxially with said side wall for providing an axial stream of hydrocarbons therein, and air introduction means including an annular air inlet at said one end surrounding said injector and adapted to feed air into said chamber in an annular stream surrounding the hydrocarbon stream, oppositely disposed air inlets extending through said side wall and adapted to feed air laterally into said chamber, and means adapted to supply air under pressure simultaneously through said annular inlet and said side wall inlets.

8. Apparatus as described in claim 7 wherein the last recited means include a common air supply pipe connected by branch pipes to the several air inlets and means in the respective branch pipes adapted to adjust the rates of air flow to the respective air inlets.

9. A retort for producing finely divided carbon from hydrocarbons comprising a cylindrical heat-insulating heat-radiant side wall defining an elongated reaction chamber therewithin adapted to be maintained at hydrocarbon cracking temperatures, means including a hydrocarbon injector at one end of said chamber directed axially thereinto for providing therein an axial stream of the hydrocarbons, and air introduction means including an annular header at said one end having an annular air passage directed into said chamber and surrounding said injector, said air introduction means including also a plurality of oppositely disposed air inlets extending laterally through said side wall into said chamber intermediate the ends thereof.

10. A retort as described in claim 9 in which the side wall air inlets are directed tangentially into said chamber so as to provide a spiral motion against the side wall of the air introduced therethrough.

11. A retort as described in claim 9 in which the side wall air inlets are directed radially toward the axis of said chamber.

12. Apparatus for producing finely divided carbon from hydrocarbons comprising a retort having a cylindrical heat-insulating heat-radiant side wall bounding an elongated reaction chamber therewithin adapted to be maintained at hydrocarbon cracking temperatures, means including a hydrocarbon injector at one end of said chamber directed axially thereinto and adapted to provide an axial stream of hydrocarbons therein, air introduction means including an annular header at said one end having an annular air passage directed into said chamber and surrounding said injector and adapted to direct air into said chamber in an annular stream surrounding and then impinging with the hydrocarbon stream in said chamber, an air intake extending tangentially into said header, and means adapted to force air under pressure through said intake and said header so as to produce a spiral swirling motion of said annular air stream, said air introduction means including also a plurality of air inlets extending laterally through said side wall into said chamber intermediate the ends thereof.

13. In an apparatus for producing finely divided carbon, a retort having a cylindrical heat-insulating heat-radiant side wall and walls across the front and the rear thereof enclosing therewith an elongated cylindrical reaction chamber adapted to be maintained at hydrocarbon cracking temperatures, said rear wall being of heat-radiant refractory material and having passageway for the discharge of reaction products from said chamber, a hydrocarbon atomizing injector adjacent said front wall directed axially into said chamber, means including a high pressure pump connected with said injector and adapted to force hydrocarbon liquid through said injector, air introduction means opening into said chamber including an annular inlet surrounding said injector adapted to direct air under pressure into said chamber in an annular stream surrounding the injected hydrocarbons so that the hydrocarbons and the air may mingle and react within said chamber, a heat-dissipating enclosure extending beyond said rear wall in communication with said passageway through which to conduct and in which to cool said reaction products, conduits extending into said enclosure for introducing aqueous fluid thereinto to maintain therein a body of steam, and means beyond and connected with said enclosure for continuously collecting carbon from said products.

14. In an apparatus for producing finely divided carbon, a retort having a cylindrical heat-insulating heat-radiant side wall and walls across the front and the rear thereof enclosing therewith an elongated cylindrical reaction chamber adapted to be maintained at hydrocarbon cracking temperatures, said rear wall being of heat-radiant refractory material and having passageway for the discharge of reaction products from said chamber, a hydrocarbon atomizing injector adjacent said front wall directed axially into said chamber, means including a high pressure pump connected with said injector and adapted to force liquid hydrocarbons through said injector, air introduction means opening into said chamber including an annular inlet surrounding said injector to direct air under pressure into said chamber in an annular stream surrounding said hydrocarbon stream so that the hydrocarbons and air of said streams may mingle and react within said chamber, said inlet including coaxial annular air-guiding elements spaced apart in radial direction and relatively adjustable in axial direction, at least one of said elements having a plurality of annular surfaces disposed at different angles to its axis and operative in different positions of relative adjustment of said elements to impart predetermined different angles of entrance to said annular air stream with respect to the axis of said chamber, and means to set said elements in any selected one of said positions, whereby the location of reaction within said chamber and the quality of the carbon product may be adjusted, a heat-dissipating enclosure extending beyond said rear wall in communication with said passageway through which to conduct and in which to cool said reaction products, and means beyond and connected with said enclosure for continuously collecting carbon from said products.

15. In an apparatus for producing finely divided carbon from liquid hydrocarbons, a retort having a cylindrical heat-radiant refractory side wall defining therewithin an elongated cylindrical reaction chamber adapted to be maintained at hydrocarbon cracking temperatures, a hydrocarbon atomizing spray nozzle disposed at the front end of the retort and directed into said chamber coaxially with said side wall, means including a high pressure pump connected with said nozzle and adapted to force liquid hydrocarbons under high pressure through said nozzle, said nozzle having means therein adapted to whirl the liquid forced therethrough and produce a conical atomized stream thereof, air introduction means including an annular inlet at said front end surrounding said nozzle and adapted to force air into said zone in an annular stream surrounding and impinging with the hydrocarbon stream, the said annular inlet having coaxial annular air-guiding elements spaced apart in radial direction and relatively adjustable in axial direction, at least one of said elements having a plurality of annular surfaces disposed at different angles to its axis and operative in different positions of relative adjustment of said elements to impart predetermined different angles of entrance to said annular air stream with respect to the axis of said chamber, and means to set said elements in any selected one of said positions.

16. In an apparatus for producing finely divided carbon from liquid hydrocarbons, a retort having a reaction chamber adapted to be maintained at hydrocarbon cracking temperatures and bounded by a cylindrical heat-radiant refractory side wall and a perforate heat-radiant refractory wall across one end of said side wall through which to discharge reaction products, a hydrocarbon atomizing spray nozzle disposed at the other end of the retort and directed into said chamber coaxially with said side wall, means adapted to force liquid hydrocarbons under high pressure through said spray nozzle, said nozzle having means therein adapted to whirl the liquid forced therethrough and produce a conical atomized stream thereof, air introduction means including an annular inlet at said other end surrounding said nozzle adapted to force air into said chamber in an annular stream surrounding the hydrocarbon stream, said air introduction means also including a plurality of spaced inlets opening into said chamber through said side wall, the said annular inlet having coaxial annular air-guiding elements spaced apart in radial direction and relatively adjustable in axial direction, at least one of said elements having a plurality of annular surfaces disposed at different angles to its axis and operative in different positions of relative adjustment of said elements to impart predetermined different angles of entrance to said annular air stream with respect to the axis of said chamber, and means to set said elements in any selected one of said positions, whereby to adjust the place of impingement of said streams and vary the reaction conditions, an enclosure having heat-dissipating walls extending beyond said perforate end wall through which to conduct and in which to cool said reaction products, and means beyond and connected with said enclosure for continuously collecting carbon from the cooled products.

17. In an apparatus for producing finely divided carbon from liquid hydrocarbons, a retort having a cylindrical reaction chamber adapted to be maintained at hydrocarbon cracking temperatures and bounded by a cylindrical heat-insulating heat-radiant side wall, a hydrocarbon atomizing spray nozzle disposed in the front end of the retort and directed axially into said chamber, means including a high pressure pump connected with said nozzle adapted to force liquid hydrocarbons under high pressure through said nozzle, said nozzle having means therein adapted to whirl said hydrocarbons and supply a conical atomized stream thereof into said chamber, air introduction means including an annular air inlet around said spray nozzle directed into said chamber and adapted to supply thereinto an annular air stream surrounding said stream of hydrocarbons, the exterior of said spray nozzle having a plurality of differently inclined annular surfaces respectively constituting a part of said air inlet in different linear positions of said nozzle to establish predetermined different angles of flow for the annular air stream into said chamber, and means to set said nozzle at any of said different positions.

18. In an apparatus for producing finely divided carbon from liquid hydrocarbons, a retort having a cylindrical reaction zone bounded by a cylindrical heat-radiant refractory side wall adapted to be maintained at hydrocarbon cracking temperature, an atomizing spray nozzle adjacent the front end of the retort directed into said zone coaxially with respect to said side wall, means to force liquid hydrocarbons under high pressure through said spray nozzle, means in the nozzle adapted to produce a conical atomized spray of the hydrocarbons within the reaction zone of the retort, a conical air guide surrounding said spray nozzle in spaced relation thereto to provide an annular air inlet opening into said zone, means adapted to force air into the retort under pressure through said air inlet, an enlargement on said spray nozzle located within said air guide, said enlargement having a cylindrical surface and two oppositely directed conical surfaces, and means adapted to adjust the position of the enlargement of the spray nozzle with respect to said air guide so as to locate the cylindrical surface thereof or either of the conical surfaces thereof opposite the said air guide whereby to vary the direction of the annular air stream into said zone.

19. Apparatus for producing finely divided carbon from hydrocarbons comprising a retort having an elongated reaction chamber adapted to be maintained at hydrocarbon cracking temperatures and bounded by a cylindrical heat-insulating heat-radiant side wall, means including a hydrocarbon injector mounted at one end of said chamber and directed thereinto coaxially with said side wall for providing an axial stream of hydrocarbons in said chamber, and air introduction means comprising at least one air inlet extending through said side wall and directed tangentially into said chamber to provide therein a spirally moving air stream surrounding said hydrocarbon stream so that the hydrocarbons and the air within said chamber mingle and react therein in a swirling condition.

JOSEPH W. AYERS.

REFERENCES CITED

The following references are of record in the file of this patent:

UNITED STATES PATENTS

| Number | Name | Date |
|---|---|---|
| 1,709,535 | McVay | Apr. 16, 1929 |
| 2,222,031 | Hammer | Nov. 19, 1940 |
| 1,743,129 | Gilbert | Jan. 14, 1930 |
| 2,186,373 | Faulds | Jan. 9, 1940 |
| 2,275,395 | Bailey | Mar. 3, 1942 |
| 1,438,032 | Frost | Dec. 5, 1922 |
| 1,618,808 | Burg | Feb. 22, 1927 |
| 2,153,951 | Barber | Apr. 11, 1939 |
| 1,807,321 | Miller | May 26, 1931 |
| 2,292,355 | Ayers | Aug. 11, 1942 |

FOREIGN PATENTS

| Number | Country | Date |
|---|---|---|
| 286,207 | Great Britain | Dec. 8, 1928 |

Certificate of Correction

Patent No. 2,420,999.  May 27, 1947.

JOSEPH W. AYERS

It is hereby certified that errors appear in the printed specification of the above numbered patent requiring correction as follows: Column 4, line 70, strike out "the" before "vane"; column 11, line 65, for "illustarted" read *illustrated*; column 14, line 62, claim 4, after the word "therein" insert *in*; column 18, line 42, claim 18, for "temperature" read *temperatures*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.* gentially into said chamber to provide therein a spirally moving air stream surrounding said hydrocarbon stream so that the hydrocarbons and the air within said chamber mingle and react therein in a swirling condition.

JOSEPH W. AYERS.

REFERENCES CITED

The following references are of record in the file of this patent:

UNITED STATES PATENTS

| Number | Name | Date |
|---|---|---|
| 1,709,535 | McVay | Apr. 16, 1929 |
| 2,222,031 | Hammer | Nov. 19, 1940 |
| 1,743,129 | Gilbert | Jan. 14, 1930 |
| 2,186,373 | Faulds | Jan. 9, 1940 |
| 2,275,395 | Bailey | Mar. 3, 1942 |
| 1,438,032 | Frost | Dec. 5, 1922 |
| 1,618,808 | Burg | Feb. 22, 1927 |
| 2,153,951 | Barber | Apr. 11, 1939 |
| 1,807,321 | Miller | May 26, 1931 |
| 2,292,355 | Ayers | Aug. 11, 1942 |

FOREIGN PATENTS

| Number | Country | Date |
|---|---|---|
| 286,207 | Great Britain | Dec. 8, 1928 |

Certificate of Correction

Patent No. 2,420,999.   May 27, 1947.

JOSEPH W. AYERS

It is hereby certified that errors appear in the printed specification of the above numbered patent requiring correction as follows: Column 4, line 70, strike out "the" before "vane"; column 11, line 65, for "illustarted" read *illustrated*; column 14, line 62, claim 4, after the word "therein" insert *in*; column 18, line 42, claim 18, for "temperature" read *temperatures*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*